(12) United States Patent
Vion-Dury

(10) Patent No.: US 8,473,740 B2
(45) Date of Patent: Jun. 25, 2013

(54) METHOD AND SYSTEM FOR SECURED MANAGEMENT OF ONLINE XML DOCUMENT SERVICES THROUGH STRUCTURE-PRESERVING ASYMMETRIC ENCRYPTION

(75) Inventor: Jean-Yves Vion-Dury, Biviers (FR)

(73) Assignee: Xerox Corporation, Norwalk, CT (US)

( * ) Notice: Subject to any disclaimer, the term of this patent is extended or adjusted under 35 U.S.C. 154(b) by 142 days.

(21) Appl. No.: 13/103,216

(22) Filed: May 9, 2011

(65) Prior Publication Data
US 2012/0290837 A1    Nov. 15, 2012

(51) Int. Cl.
*H04L 9/00* (2006.01)
*H04L 9/32* (2006.01)

(52) U.S. Cl.
USPC ............................ 713/167; 713/189; 380/277

(58) Field of Classification Search
USPC ............. 713/167, 189, 193; 380/277; 726/26, 726/27, 30
See application file for complete search history.

(56) References Cited

U.S. PATENT DOCUMENTS

| 7,392,391 | B2 * | 6/2008 | Eibach et al. ................. 713/175 |
| 7,774,831 | B2 * | 8/2010 | Kuznetsov et al. ............. 726/12 |
| 8,306,920 | B1 * | 11/2012 | Lynch ............................. 705/71 |
| 2008/0071814 | A1 | 3/2008 | Mittal et al. |

OTHER PUBLICATIONS

SCAN, Trusted ICT Security Solution Provider. http://www.scan-associates.net/product_securedoc.htm—accessed Jan. 20, 2011.
VaultMate, Enterprise Privacy Solution, http://www.vaultmate.com/features.php—accessed Jan. 20, 2011.
Public-key Cryptography, Wikipedia, http://en.wikipedia.org/wiki/Public_key_encryption—accessed Jan. 20, 2011.
Symmetric-key algorithm, Wikipedia, http://en.wikipedia.org/wiki/Symmetric_key_algorithm—accessed Jan. 20, 2011.
RSA, Wikipedia, http://en.wikipedia.org/wiki/RSA—accessed Jan. 20, 2011.
Homomorphic Encryption, Wikipedia, http://en.wikipedia.org/wiki/Homomorphic_encryption—accessed Jan. 20, 2011.
Optimal Asymmetric Encryption Padding, Wikipedia, http://en.wikipedia.org/wiki/Optimal_Asymmetric_Encryption_Padding—accessed Jan. 20, 2011.
Bellare, et al. "Optimal Asymmetric Encryption—How to encrypt with RSA," Extended abstract in Advances in Cryptology—Eurocrypt '94 Proceedings, Lecture Notes in Computer Science vol. 950, A. De Santis ed, Springer-Verlag, 1995.
Shoup, "OAEP Reconsidered," IBM Zurich Research Lab, Saumerstr. 4, 8803 Ruschlikon, Switzerland. Sep. 18, 2001.

(Continued)

*Primary Examiner* — Hosuk Song
(74) *Attorney, Agent, or Firm* — Fay Sharpe LLP

(57) ABSTRACT

A system and method for encrypting/decrypting a document is provided. The encryption method includes encrypting portions within the document containing structural information with an asymmetric public key, encrypting portions within the document containing content information with a symmetric private key, and outputting the document, whereby a service provider provided with a public key is able to access and process only the structural information.

26 Claims, 13 Drawing Sheets

OTHER PUBLICATIONS

Jammalamadaka, et al. "Querying Encrypted XML Documents," Proceedings of the 10th International Database Engineering and Applications Symposium, p. 129-136, Dec. 11-14, 2006.

The FIPS 180-2 publication on Secure Hash Algorithms, Aug. 1, 2002.

Carminati, et al. "Securing XML data in third-party distribution systems," in Proceedings of the 14th ACM International Conference on Information and Knowledge Management (CIKM), 99-106, 2005.

Wang, et al. "Efficient Secure Query Evaluation over Encrypted XML Database," VLDB Sep. 12-15, 2006.

Ünay, et al. "A Survey on Querying Encrypted XML Documents for Databases as a Service," SIGMOD Record, Mar. 2008 (vol. 37, No. 1).

eXist Open Source Native Database, Configuring Database Indexes, http://exist.sourceforge.net/indexing.html—accessed Jan. 20, 2011.

Xindices 1.1, The Apache XML project, Administration Guide, http://xml.apache.org/xindice/guide-administrator.html—accessed Jan. 20, 2011.

Schrefl, et al. "SemCrypt-Ensuring Privacy of Electronic Documents Through Semantic-Based Encrypted Query Processing," Proceedings of the 21st International Conference on Data Engineering Workshop, 2005.

* cited by examiner

```
1. <?xml version="1.0" encoding="utf-8"?>
2. <xsl:stylesheet
3.          xmlns:xsl="http://www.w3.org/1999/XSL/Transform" version="2.0"
4.          xmlns:doc="http://docbook.org/ns/docbook"
5.    13    exclude-result-prefixes = "doc"
6.          >
7.          <xsl:output indent="yes"/>
8.
9.          <xsl:preserve-space elements="doc:section doc:title"/>
10.
11. <xsl:template match="doc:article[doc:title]">
12.         <xsl:copy>
13.               <xsl:apply-templates select="doc:title"></xsl:apply-templates>
14.    13      <xsl:apply-templates select="doc:section"/>
15.         </xsl:copy>
16. </xsl:template>
17.
18.   <xsl:template match="doc:section[doc:title]">
19. 13      <xsl:copy>
20.               <xsl:apply-templates select="doc:title"></xsl:apply-templates>
21.         </xsl:copy>
22. </xsl:template>
23.
24. <xsl:template match="doc:title">
25.         <xsl:copy>
26.               <xsl:apply-templates />
27.         </xsl:copy>
28. </xsl:template>
29.
30. </xsl:stylesheet>
```

FIG. 2

```
1. <?xml version="1.0" encoding="utf-8"?>

3. <_B096AODK382DK22 xmlns='BB023K20DJSJKSDOWOJSU3J7JKSI820APP'>
4.   <_C97SHEPACC63KS0K>Flatland</_C97SHEPACC63KS0K>
5.     <_56CSK2SLFICM>A Romance of Many Dimensions</_56CSK2SLFICM>
6.   <_38299D9D>
7.     <_YYS6FKSM3S77>
8.       <_NJS73HSLQ43N6C>If my poor Flatland friend retained the vigor of mind
9.       which he enjoyed when he began to compose these Memoirs, I should not
10.      now need to represent him in this preface, in which he desires.
11.      </_NJS73HSLQ43N6C>
12.    </_YYS6FKSM3S77>
13.    <_8NDHX7333>
14.      <_XZRDS8322>
15.        <_8SUEYWKDSS>Edwin</_8SUEYWKDSS >
16.        <_OIS7DJSJ33>Abbott</_OIS7DJSJ33>
17.      </_XZRDS8322>
18.    </_8NDHX7333>
19.  </_38299D9D>
20.  <_5TF2BDKJS>
21.    <_C97SHEPACC63KS0K>Section 1: Of the Nature of Flatland</_C97SHEPACC63KS0K>
22.    <_NJS73HSLQ43N6C>Imagine a vast sheet of paper on which straight Lines,
       Triangles,
23.    Squares, Pentagons, Hexagons, and other figures, instead of remaining
24.    fixed in their places, move freely about, on or in the surface, but
25.    without the power of rising above or sinking below it, very much like
26.    shadows - only hard and with luminous edges - and you will then have a
27.    pretty correct notion of my country and countrymen. Alas, a few years
28.    ago, I should have said "my universe": but now my mind has been opened
29.    to higher views of things.
30.    </_NJS73HSLQ43N6C>
31.  </_5TF2BDKJS>
32.  <_5TF2BDKJS> ...
     ooo
100. </_B096AODK382DK22>
```

FIG. 3

```
1. <?xml version="1.0" encoding="utf-8"?>
2. <xsl:stylesheet
3.          xmlns:xsl="http://www.w3.org/1999/XSL/Transform" version="2.0"
4.          xmlns:DD89FG9T3="BB023K20DJSJKSDOWOJSU3J7JKSI820APP"
5.          exclude-result-prefixes = "DD89FG9T3"
6.          >
7.          <xsl:output indent="yes"/>
8.
9.          <xsl:preserve-space elements="DD89FG9T3:_5TF2BDKJS DD89FG9T3:_C97SHEPACC63KS0K"/>
10.
11. <xsl:template match="DD89FG9T3:_B096AODK382DK22[DD89FG9T3:_C97SHEPACC63KS0K]">
12.          <xsl:copy>
13.                  <xsl:apply-templates select="DD89FG9T3:_C97SHEPACC63KS0K"></xsl:apply-templates>
14.                  <xsl:apply-templates select="DD89FG9T3:_5TF2BDKJS"/>
15.          </xsl:copy>
16. </xsl:template>
17.
18.      <xsl:template match="DD89FG9T3:_5TF2BDKJS[DD89FG9T3:_C97SHEPACC63KS0K]">
19.          <xsl:copy>
20.                  <xsl:apply-templates select="DD89FG9T3:_C97SHEPACC63KS0K"></xsl:apply-templates>
21.          </xsl:copy>
22. </xsl:template>
23.
24. <xsl:template match="DD89FG9T3:_C97SHEPACC63KS0K">
25.          <xsl:copy>
26.                  <xsl:apply-templates />
27.          </xsl:copy>
28. </xsl:template>
29.
30. </xsl:stylesheet>
```

FIG. 4

```
1. <?xml version="1.0" encoding="UTF-8"?>
2. <_B096AODK382DK22 xmlns="BB023K20DJSJKSDOWOJSU3J7JKSI820APP">
3.     <_C97SHEPACC63KS0K> QQ38SWKDKW0392K3KKDADF82JCNHCMSUEE </_C97SHEPACC63KS0K>
4.     <_5TF2BDKJS>
5.         <_C97SHEPACC63KS0K> DQGTMCBOVJRRKG6TMTZXNXKHUVTB2R8TBQR4NMKD
                </_C97SHEPACC63KS0K>
6.     </_5TF2BDKJS>
7.     <_5TF2BDKJS>
8.         <_C97SHEPACC63KS0K> KD203KDK203928SKDKWNCMZSHEI28D92DXZZ392DSDR
                </_C97SHEPACC63KS0K>
9.     </_5TF2BDKJS>
10.    <_5TF2BDKJS>
11.        <_C97SHEPACC63KS0K> NNCKDJE7FHJDKSDHEI3EJCMKMZHJWGRE76FVJAQLFGDDRJ
                </_C97SHEPACC63KS0K>
12.    </_5TF2BDKJS>
13.    <_5TF2BDKJS>
14.        <_C97SHEPACC63KS0K> NNSHFUDK3787FNJXNXHJD873J3MKXS8822222BSGF12IDNX8
                </_C97SHEPACC63KS0K>
15.    </_5TF2BDKJS>
16.    <_5TF2BDKJS>
17.        <_C97SHEPACC63KS0K> B88UDHNSJUJH3J3H3G2JXSNCMSY18297
                </_C97SHEPACC63KS0K>
18.    </_5TF2BDKJS>
19.    <_5TF2BDKJS>
20.        <_C97SHEPACC63KS0K> MMZNDUYW6DH28S8AKJK37DHUYDHU333
                </_C97SHEPACC63KS0K>
21.    </_5TF2BDKJS>
22.    <_5TF2BDKJS>
23.        <_C97SHEPACC63KS0K> OO8DFJSJK238DJXMF23NVKST4JJSDKIJ34J4JHG1
                </_C97SHEPACC63KS0K>
24.    </_5TF2BDKJS>
25. </_B096AODK382DK22>
```

FIG. 10

```
1.  <?xml version="1.0" encoding="UTF-8"?>
2.  <article xmlns="http://docbook.org/ns/docbook">
3.          <title>Flatland</title>
4.          <section>
5.                  <title> Section 1: Of the Nature of Flatland</title>
6.          </section>
7.          <section>
8.                  <title> Section 2. Of the Climate and Houses in Flatland </title>
9.          </section>
10.         <section>
11.                 <title> Section 3. Concerning the Inhabitants of Flatland</title>
12.         </section>
13.         <section>
14.                 <title> Section 4. Concerning the Women</title>
15.         </section>
16.         <section>
17.                 <title> Section 5. Of our Methods of Recognizing one another</title>
18.         </section>
19.         <section>
20.                 <title> Section 6. Of Recognition by Sight</title>
21.         </section>
22.         <section>
23.                 <title> Section 7. Concerning Irregular Figures</title>
24.         </section>
25. </article>
```

FIG. 12

```
 1. <?xml version="1.0" encoding="utf-8"?>
 3. <_B096AODK382DK22 xmlns='BB023K20DJSJKSDOWOJSU3J7JKSI820APP'>
 4.     <_C97SHEPACC63KS0K> QQ38SWKDKW0392K3KKDADF82JCNHCMSUEE</_C97SHEPACC63KS0K>
 5.         <_56CSK2SLFICM>
                 8382KCNMDKOJVMHHIAIO28DHMZHJATGRUJ2873487D9SJ3NDKSJDHFA
             </_56CSK2SLFICM>
 6.     <_38299D9D>
 7.         <_YYS6FKSM3S77>
 8.             <_NJS73HSLQ43N6C>
SONNSK30KSZNCJHS7329D5KSJSMZDJS8DMXJFDLSJEUIWKDJUSOEU23JSHDUYULAJLEOIUYAKJASDLKJF2
87DHALUY3H2LKA87CLJK3780SALJDAKSD82HDDSAYDASLKH92J3HLANXBCMU77DNVGWQPNDJHCJDHF
USKJEUYDKSLKAI3MJDNJ8KSHJ31SKJHZ
11.             </_NJS73HSLQ43N6C>
12.         </_YYS6FKSM3S77>
13.         <_8NDHX7333>
14.             <_XZRDS8322>
15.                 <_8SUEYWKDSS>DKJS832KSS</_8SUEYWKDSS >
16.                 <_OIS7DJSJ33>MMSNDJD7SSD</_OIS7DJSJ33>
17.             </_XZRDS8322>
18.         </_8NDHX7333>
19.     </_38299D9D>
20.     <_5TF2BDKJS>
21.         <_C97SHEPACC63KS0K>
                 KD203KDK203928SKDKWNCMZSHEI28D92DXZZ392DSDR
             </_C97SHEPACC63KS0K>
22.         <_NJS73HSLQ43N6C>
MSDJDK83LSKDNXLSKE20LAJXH23WUJ3478CNHSJWIU2HYGYT23JS82JSKJMXBCY23HJNC745RBS5EPXCD
HJ4387DS0SNHJCH3H2KJDXJCFDYU73NJHXJXUO2314O76ASDLFHASDLJBN2HNCNDJ289SKDJSBCKSUDHF
LKAJSY3EKLSMXBHWJU37FDCJSHGXCK3298ED0DJSDMDNCHYSUJ2JH12ID7CDJHSS82198DSCJNCBVCNX
NMJHDS987H1HJHKLJHKJSNCJH3K23LKZMCNFDJ3EWJ398DJ2JK4387DJK209D87SLK3KJ38S79832HDJHA
LDJXMJDSJ3MJF743NZMJFU4JNKSDUJSUE4JKSUEKSXI34UDKSKIDFU3K2JJ190FCJDHCUEMNYUXCUSIKDF
UEYIUWHKJUISIUEJXKKLKAS87EJU39XSJCMXUDUJ2KOI3JJ
30.         </_NJS73HSLQ43N6C>
31.     </_5TF2BDKJS>
32.     <_5TF2BDKJS> ...
    o
    o
    o
100. </_B096AODK382DK22>
```

FIG. 13

METHOD AND SYSTEM FOR SECURED MANAGEMENT OF ONLINE XML DOCUMENT SERVICES THROUGH STRUCTURE-PRESERVING ASYMMETRIC ENCRYPTION

BACKGROUND

The exemplary embodiment relates to the field of document processing. It finds particular application in connection with selectively encrypting XML documents for processing to enhance security.

There are multiple service providers that provide remote processing services of structured documents, such as extensible markup language (XML) documents. For example, a customer may request that a service provider performs batch operations on a set of XML documents such as indexing, validation and transformation through a world wide web (WWW) interface. Currently, when a customer wants an external service provider to host and manage confidential documents, the customer has to be able to trust the service provider, along with the service provider's information system and internal policies regarding confidential material. Confidential documents may be transmitted to the service provider's hosting system over an encrypted secured channel to protect the sensitive information from being intercepted during transmission. Additionally, the documents themselves may be encrypted in a manner that allows only the receiving party (e.g., the service provider) to decrypt and read the documents. Provided that the decryption key is not known by the service provider, pure storage and archiving of encrypted documents is highly secure, but of little interest as no meaningful operations can be performed on the customer's documents.

However, an XML document, once encrypted using standard approaches, is like an opaque and flat bit packet on which only two basic operations can be undertaken: integrity checking and decryption. Therefore, once transmitted to and hosted at the service provider, the document must be decrypted in order to offer complex processing involved in services such as indexing, validation and transformation. In order to allow for decryption of the customer's documents at the service provider, the customer shares the decryption key with the service provider which can be risky. The decryption key may be intercepted or used by the intended recipient in an unauthorized manner. Moreover, there is the problem of data remanence (persisting information on a disk after file system deletion), as well as bugs or viruses on the service provider's system that may compromise the security of any stored documents. Thus, in order for services to be provided to a customer, the underlying data and structure of the customer's documents must be readable by the service provider without risk to the confidentiality of the customer's data. Accordingly, it is desirable to have a method and system for preserving security for confidential documents while retaining the ability to process the documents remotely by a service provider.

BRIEF DESCRIPTION

In accordance with one aspect of the exemplary embodiment, a method for encrypting a document is provided. The method includes encrypting portions of the document containing structural information with an asymmetric public key, encrypting portions of the document containing content information with a symmetric private key, and outputting the document to computer memory.

In accordance with another aspect of the exemplary embodiment, a method for decrypting an encrypted document is provided. The method includes decrypting portions within the encrypted document containing structural information with an asymmetric private key, decrypting portions within the encrypted document containing content information with a symmetric private key, and outputting the decrypted document.

In accordance with another aspect of the exemplary embodiment, a method for performing XML operations on an encrypted XML document is provided. The method includes generating an encrypted XML output document by performing XML operations on the encrypted XML document based on the encrypted structural information.

In accordance with yet another aspect of the exemplary embodiment, a system for encrypting a source document and decrypting an encrypted document is provided. The system includes memory which stores a structure detection module, a content detection module, a structure encryption and decryption module, a content encryption and decryption module, and a processor to implement the modules. The structure detection module is adapted to determine portions within the source document or encrypted document containing structural information. The content detection module is adapted to determine portions within the source document or encrypted document containing content information. The structure encryption and decryption module is adapted to perform at least one action including encrypting the determined structural information portions within the source document with an asymmetric public key, and decrypting the determined structural information portions within the encrypted document with an asymmetric private key. The content encryption and decryption module is adapted to perform at least one action from a set of actions including encrypting the determined content information portions within the source document with a symmetric private key, and decrypting the determined content information portions within the encrypted document with the symmetric private key.

BRIEF DESCRIPTION OF THE DRAWINGS

FIG. 2 illustrates an example ancillary XML document embodied as an XSL stylesheet;

FIG. 3 illustrates the XML document of FIG. 1 with encrypted structural information portions;

FIG. 4 illustrates the ancillary XML document of FIG. 2 with encrypted portions;

FIG. 10 illustrates the encrypted XML output of an XML operation performed on the encrypted XML document of FIG. 3 with respect to the encrypted ancillary XML document of FIG. 4;

FIG. 12 illustrates the decrypted XML document of FIG. 10; and

FIG. 13 illustrates the encrypted XML document of FIG. 3 with the content information portions encrypted.

DETAILED DESCRIPTION

Figure 1:
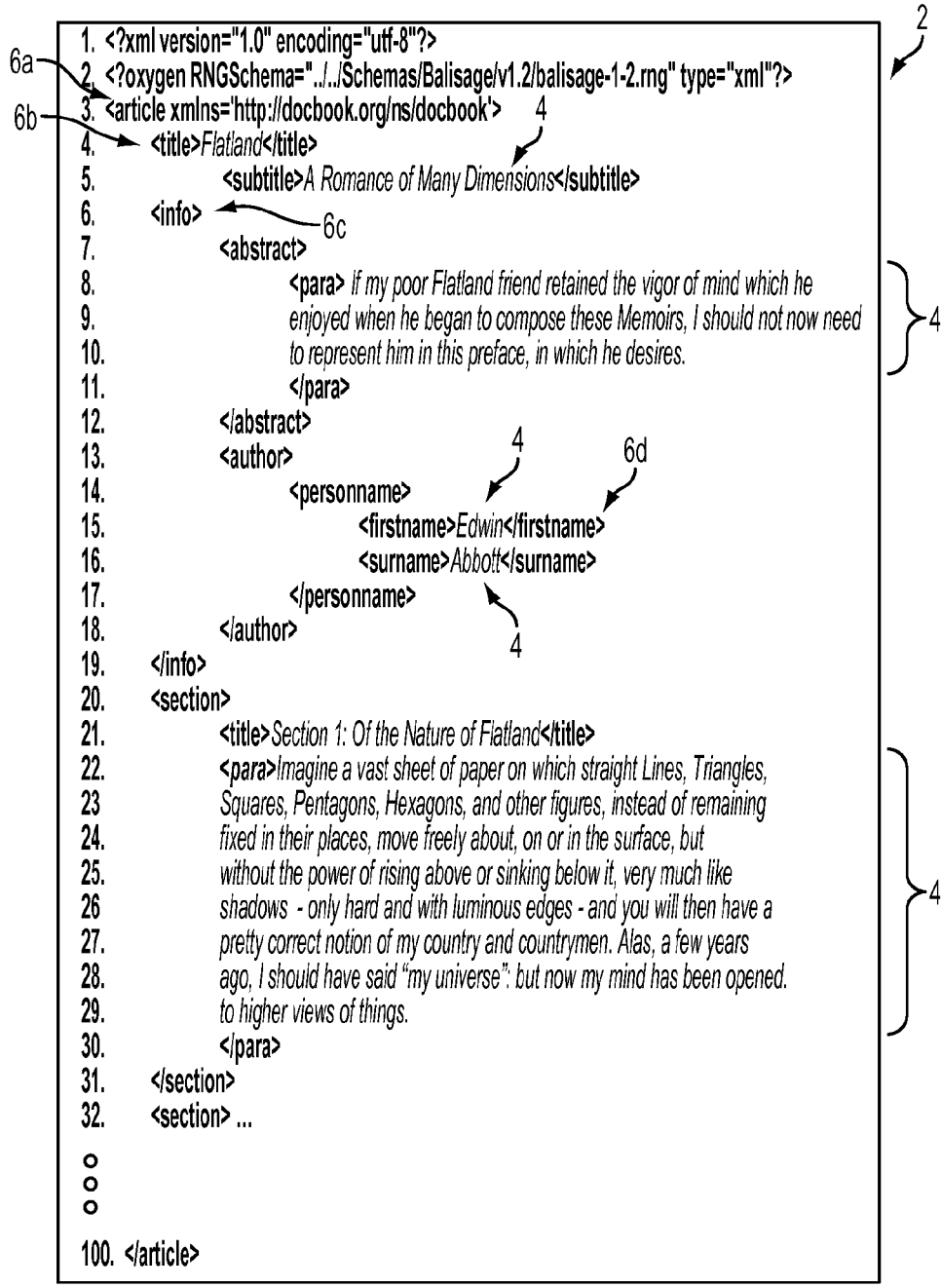
FIG. 1 illustrates an example XML document containing structural information portions and content information portions.

Aspects of the exemplary embodiment relate to a method and system for document encryption for providing secure processing of documents by a service provider. The exemplary method and system allow for meaningful processing of encrypted XML documents at a service provider without requiring decryption. The XML documents are encrypted by a client device using both symmetric and asymmetric encryption mechanisms. That is, the encryption process allows for isomorphic encryption of the customer's XML document data such that the service provider may perform operations on the XML document without decrypting the data. This process ensures confidentiality at the service provider since the decryption key is not transmitted to or known by the service provider. The output of the service provider is an encrypted document that may be decrypted by the customer at the customer's secure location. As used herein, a customer can be any source of a document encrypted by the methods herein and a service provider can be any recipient of the encrypted document who can process the encrypted document without access to the data.

The exemplary method and system operate on structured documents such as XML documents and will be described with respect thereto. However, any type of document or set of data having a labeled node based logical structure capturing syntax and semantic properties of the document may be used.

In XML, it is commonly understood that textual content is generally stored in leaves (the so called text nodes) of a tree whereas meta-information such as presentation style and structure are conveyed by namespaces, tag names and additional attributes-values pairs encapsulating the leaves and serving as higher level nodes which connect the leaves with a single root node or document head. An example XML document 2 is presented in FIG. 1. Tags 6*a-d* are examples of document elements providing structural information, while portions 4 contain the content information of the document 2. The content information is shown in italics for ease of illustration only. In one aspect of the exemplary embodiment, with respect to source XML documents, information between consecutive brackets "<" and ">" (except for attribute values) such as tags and attribute names is considered structural information 6, and all other information is considered content information 4. In some alternate embodiments, information derived from document markup (whether from tags or other sources of meta-data) is considered structural information, and all other information is considered content information. In other embodiments, structural information is any metadata used to capture and transmit information as related to the logical organization of content information.

Optional ancillary XML documents may be used to perform specified XML operations on the source XML document 2. The ancillary XML document 10 is supplemental to the XML document 2 and is used to assist in remote processing of the XML document 2. For example, with respect to XML transformation operations, an XSL stylesheet (such as shown in FIG. 2) may allow an XML system to transform source XML document 2 into the format specified by the ancillary XML document 10. Generally, with respect to ancillary XML documents 10, information 11 within the document 10 used to identify or manipulate specific structural information portions 6 within a source XML document 2 is considered structural information. Portions 13 of the ancillary XML document that indicate operations to be performed are generally not considered structural information portions 11 since they indicate a function rather than structure. Additionally, some prefixes are left unencrypted in order to preserve XML interpretation properties, such as the string "x ml:". Accordingly, the exact identification of structural information 11 within an ancillary XML document 10 may change according to specific implementations.

The exemplary method and system encrypts the content information 4 of the document 2 (textual leaves) using a symmetric private key known only by the document owner (customer), and encrypts the structural portions 6 (tag names, namespaces and attribute-value pairs) through an asymmetric encryption mechanism (such as a public-private key pairing). This encryption maintains the tree structure of the XML document 2. FIG. 3 illustrates an encrypted document 14 generated from the document 2 of FIG. 1 with the structural portions 6 encrypted. For illustrative purposes, the content information 4 of FIG. 3 is presented in unencrypted form, although it is to be appreciated that the content information 4 of encrypted document 14 has been encrypted in a different manner than the structural portions. FIG. 13 illustrates the document 14 of FIG. 3 with content information 4 encrypted. FIG. 4 illustrates the exemplary ancillary XML document 10 of FIG. 2 in encrypted form 16. The document 2 is then transmitted from the customer to the service provider in encrypted form 14 without needing any particular precaution as to a secure communication channel. In this manner, the privacy and confidentiality of the document 2 is not put at risk by security breaches in the service provider's software, communication channels and systems.

The result of the bifurcated encryption is an encrypted XML document 14 that still complies with XML lexical constraints, such as wellformedness (to the extent that it was initially wellformed). Beyond preserving better isolation between the two cryptographic subsystems (symmetric for the content and asymmetric for the structure), the use of symmetric private key encryption allows for fast, possibly stream based, ciphering algorithms that provide many advantages in large document processing systems.

By way of explanation, a symmetric key encryption mechanism uses a same or similar key to both encrypt and decrypt a document. That is, if a party knows or possesses a symmetric key, then that party can both encrypt and decrypt a document, or portion thereof. Conversely, an asymmetric encryption mechanism uses separate keys to encrypt and decrypt data. A public key is used to encrypt data, and a private key is used to decrypt the data. The public key may be openly published or otherwise transferred to any party wishing to encrypt information in a manner compatible with the private key. However, once data is encrypted, only the private key is capable of decrypting the data. This asymmetric mechanism is commonly referred to public-key cryptography and, as used herein, allows the service provider to transform its XML operators (or any data input into the operators) to operate directly on the encrypted documents. One aspect of the exemplary embodiment provides for encryption aware transformation of the service provider's operators so that they become compatible with the encrypted instances. In other words, rather than decrypting the customer's documents in order to process them, the service provider may adapt its operators (such as indexation, validation and transformation operators) in order to operate on an encrypted document 14. More precisely, the operators (or data input into the operators) are transformed using a public encryption key received from the customer.

Figure 5:
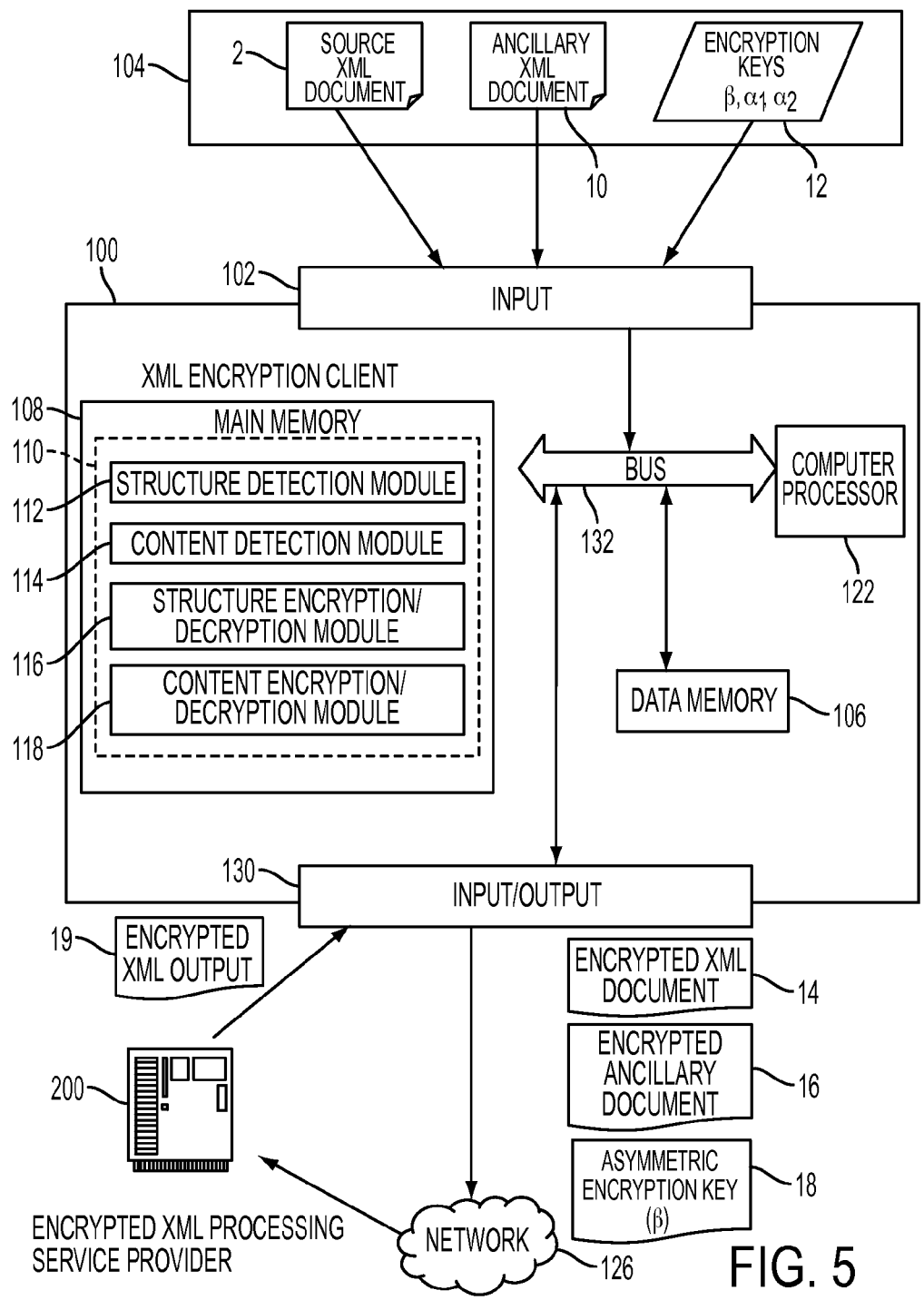
FIG. 5 illustrates a system for encrypting and decrypting an XML document to be transferred to a remote XML service provider.
Figure 6:
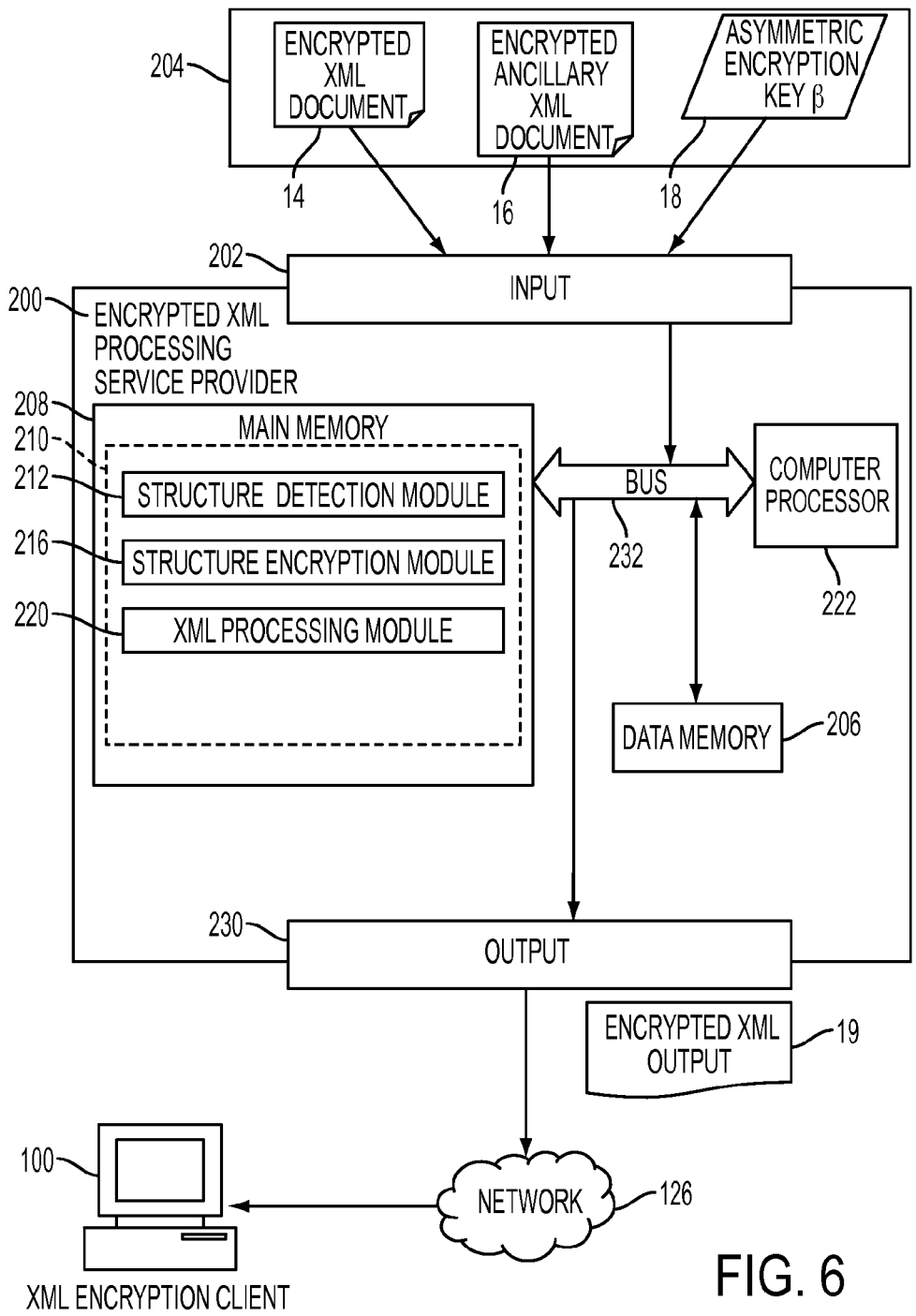
FIG. 6 illustrates a system for processing encrypted XML documents received from the system illustrated in FIG. 5.

With reference to FIGS. 5 and 6, an exemplary document encryption client 100 for encrypting a customer's XML documents 2 and an encrypted XML document processing service provider 200 for processing encrypted XML documents 14 are illustrated. Like numbered components in FIGS. 5 and 6 refer to similarly functioning modules of the respective systems 100, 200. The systems 100, 200 are non-transitory devices that each include an input device 102, 202 for receiving input. System 100 receives as input at least one unencrypted source XML document 2, an optional ancillary XML document 10, one or more encryption keys 12, and optionally an encrypted XML output 19 from the encrypted XML processing service provider 200. System 200 receives as input an encrypted XML document 14, optional encrypted ancillary XML document 16 and a public encryption key β 18 output by the encryption client 100. In the alternative, inputs 2, 10, 12, 14, 16, 18 and 19 may be produced by and/or stored in the respective systems 100, 200 themselves. In the exemplary embodiment, the input source document 2 and ancillary document 10 are XML documents. In alternate embodiments, input documents 2, 10, 14, 16 and/or 19 may be any document representing a logical tree structure wherein structural information (FIG. 1, portions 6) may be separated from the content information (FIG. 1, portions 4). In some instances, the ancillary XML document 10 may not be required, may already reside on the service provider system 200, or may be input into the service provider system 200 separately. In such instances, there may be no ancillary XML document 10 input into system 100. Additionally, it is to be appreciated that the ancillary XML document 10 may be encrypted at the client 100 with an asymmetric encryption key received from the service provider 200. In this instance, the service provider 200 is trusted to the extent that the service provider 200 may decrypt the ancillary XML document 10 (but not necessarily the source XML document 2) with a private key corresponding to the public encryption key.

As used herein, encryption key β is a public encryption key paired with private decryption key $\alpha_1$, wherein each key (β, $\alpha_1$) is used for encrypting (β) and decrypting ($\alpha_1$) structural information 6 within an XML document. $\alpha_2$ is a symmetric encryption/decryption key used for both encrypting and decrypting content information 4, which is retained by the customer. The systems 100, 200 may process more than one source XML document 2, 14 and/or ancillary XML document 10, 16 at a time, either in parallel or serially. In such embodiments, there may be a separate set of encryption keys 12, 18 for one or more documents 2, 10, although this is not required. For purposes of illustration, it is assumed that only one source XML document 2 and ancillary XML document 10 is processed at a time. Prior to inputting, source XML document 2, ancillary XML document 10, encryption keys 20, encrypted XML document 14, encrypted ancillary XML document 16, and encryption key 18 may be stored in any suitable tangible storage medium 104, 204, such as a disk, ROM or RAM, or may be input into systems 100, 200 in the form of a carrier wave, e.g., via the Internet 126. The input device 102, 202 may include a modem link, a wired or wireless connection, USB port, floppy or hard disk receiver, transceiver portion of a cellular telephone, or the like and may be separated or combined with other components of systems 100, 200.

System 100 includes data memory 106 for storing the source XML document 2, ancillary XML document 10, encryption keys 12, encrypted XML document 14, encrypted ancillary XML document 16, and encryption key 18 and any other input or intermediate data generated during processing. System 200 includes corresponding data memory 206 for storing encrypted XML document 14, encrypted ancillary XML document 16, and encryption key 18 and any other input or intermediate data generated during processing. Main memory 108, 208 of systems 100, 200 stores instructions 110, 210 for performing the exemplary method. Main memory 108 of system 100 includes a structure detection module 112a, content detection module 114, structure encryption/decryption module 116, and a content encryption/decryption module 118. Main memory 208 of system 200 includes a structure detection module 212, structure encryption module 216, and an XML processing module 220. It is to be appreciated that memories 106, 206, 108, 208 of the respective systems 100, 200 may be embodied as a single memory unit, or that one or both of memories 106, 206, 108, 208 may comprise two or more component memory units. The instructions 110, 210 are suitably executed by a corresponding digital processor such as respective computer processors 122, 222. Each digital processor 122, 222 may be variously embodied, such as by a single core processor, a dual core processor (or more generally by a multiple core processor), a digital processor and cooperating math coprocessor, a digital controller, or the like. Outputs from modules 110, 210, 112, 212, 114, 116, 216, 118, 220 may be stored in memories 106, 206, 108, 208 and/or output via an input/output device 130, 230 to a corresponding XML processing service provider 200 or XML encryption client 100 or another device such as an external computer having memory and/or a processor, optionally through a network 126 such as the internet. In one illustrative example, systems 100 and/or 200 are located on a server that is part of a distributed or cloud computing network. In such a case, inputs 2, 10, 12, 14, 16, 18, 19, 20 may be input to systems 100, 200 remotely via input device 102, 202. Input 102, 202 and output 130, 230 devices may be suitably networked to a portal of the server. Processors 122, 222 and memories 106, 206, 108, 208 may be suitably embodied by a digital processor (e.g., microprocessor or parallel array of microprocessors) and memory component(s) of the server.

The functional modules 112, 212, 114, 116, 216, 118, 220 of systems 100, 200 are described briefly below, whereby the functional characteristics of the modules are explained in greater detail with respect to the exemplary method(s) of FIGS. 8, 9 and 11.

The structure detection module 112 of system 100 parses the input XML documents 2, 10, 14, 19 to determine the structural information portions 6 of these documents. Similarly, the structure detection module 212 of system 200 parses the input XML documents 14, 16 to determine the structural information portions 6 of these documents.

The content detection module 114 of system 100 parses the input XML documents 2, 14, 19 to determine the content information portions 4 of the documents 2, 14, 19.

The structure encryption/decryption module 116 of system 100 encrypts the identified structure portions 6 of source XML document 2 and portions or all of optional ancillary XML document 10 with public key β to create the encrypted XML document 14 and encrypted ancillary XML document 16, respectively. Outputs 14 and 16 are transmitted to service provider 200 for processing. The module 116 also decrypts the identified structure portions 6 of encrypted XML output 19 generated by service provider 200 with private key $\alpha_1$ so that it is unencrypted and readable. The structure encryption module 216 of system 200 has functionality similar to module 116 but does not perform decryption operations since system 200 does not have access to private key $\alpha_1$. Module 216 encrypts any ancillary XML documents 10 or other data needed for performing an operation on the encrypted XML document 14 with the public encryption key β 18 received from client system 100.

The content encryption/decryption module 118 encrypts the identified content information portions 4 of source XML document 2 and optional ancillary XML document 10 with private key $\alpha_2$, and decrypts the content information portions 4 of received encrypted XML output 19 from system 200 with the same (or functionally compatible) private key $\alpha_2$.

The XML processing module 220 of system 200 performs XML operations on the encrypted XML document 14, using an encrypted ancillary XML document 16 if required for a particular operation. Any XML operation that does not require unencrypted content information 4 or format information 6 may be performed by XML processing module 220. The output of the XML processing module 220 is a data set or document comprising encrypted XML data 19 which can then be transmitted to and decrypted by system 100.

In the exemplary embodiment, components 110, 210, 112, 212, 114, 116, 216, 118, 220 comprise software instructions stored in main memory 108, 208, which are executed by the computer processor 122, 222. The processor 122, 222, such as the computer's CPU, may also control the overall operation of the computer systems 100, 200 by execution of processing instructions stored in memories 110, 210 and/or 106, 206. Components 102, 106, 108, 122, and 130 may be connected by a data control bus 132. A similar data control bus 232 for device 200 connects components 202, 206, 222, and 230.

As will be appreciated, systems 100, 200 may include fewer or more components while still having the same functionality. For example, components 102, 106, 110, 112, 114, 116, 118, 122, 130 may be combined to form fewer components, or may be functionally separated to form more individual components. The same may apply to components of device 200.

The XML encryption client 100 and encrypted XML processing service provider 200 may each comprise one or more computing devices, such as a personal computer, PDA, laptop computer, server computer, or combination thereof. In some embodiments, the systems 100, 200 may be incorporated into an overall distributed architecture. Memories 106, 108 (206, 208) may be integral or separate and may represent any type of computer readable medium such as random access memory (RAM), read only memory (ROM), magnetic disk or tape, optical disk, flash memory, or holographic memory. In one embodiment, the memories 106, 108 (206, 208) comprise a combination of random access memory and read only memory. In some embodiments, the processor 122 (222) and memory 106 (206) and/or 108 (208) may be combined in a single chip.

The systems 100, 200 may output a portion or all of outputs 14, 16, 18, 19 to an external output device, such as a client terminal, database system, or the like. The output device 130 (230) may be connected directly with the systems 100, 200 or linked thereto, e.g., via a wired or wireless link 126, such as a local area network, wide area network, or the Internet.

The term "software" as used herein is intended to encompass any collection or set of instructions executable by a computer or other digital system so as to configure the computer or other digital system to perform the task that is the intent of the software. The term "software" as used herein is intended to encompass such instructions stored in a storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 7:
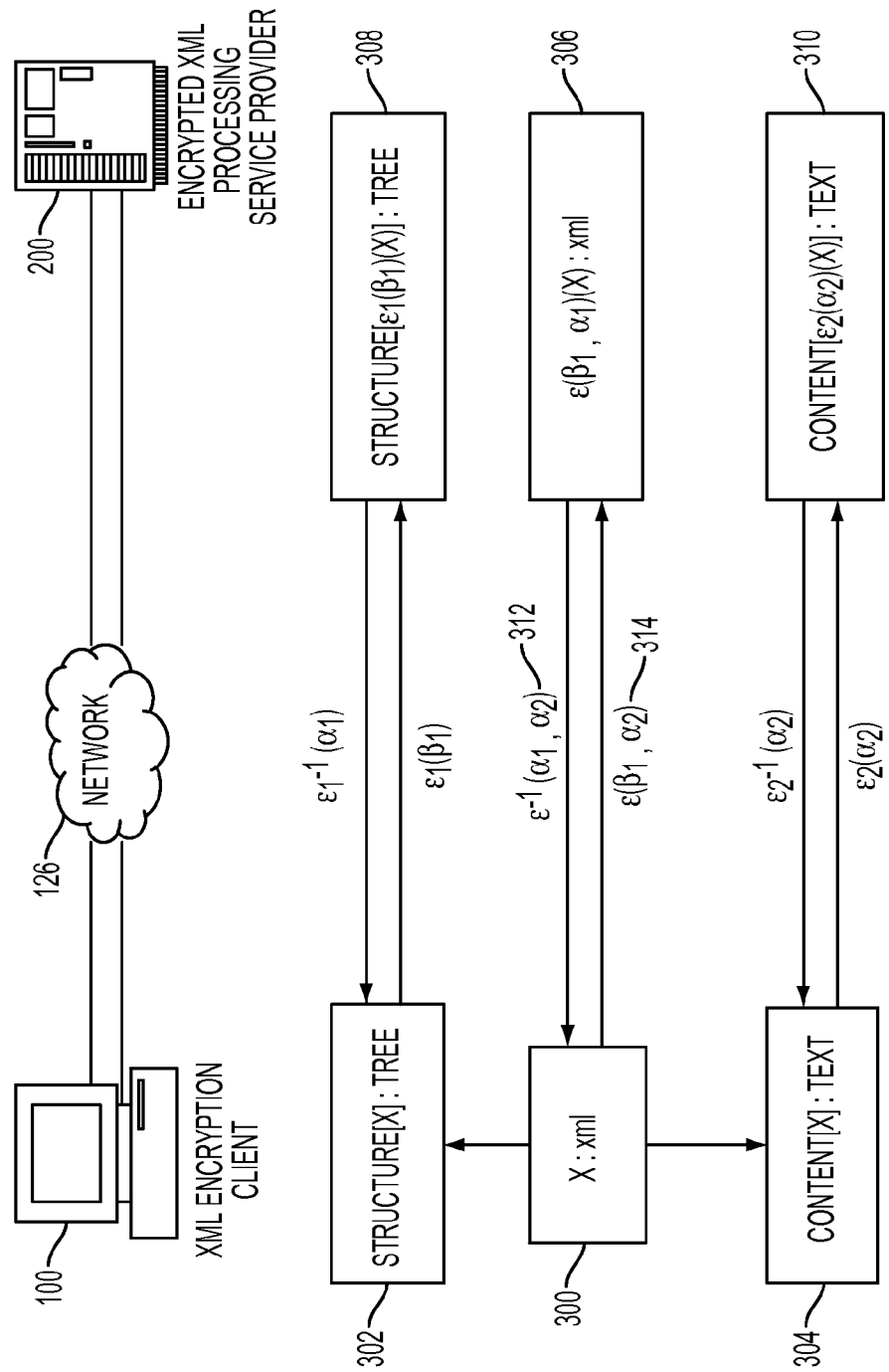
FIG. 7 is an overview of the interaction between the systems of FIGS. 5 and 6 with respect to the encryption and decryption processes used at each respective system.

FIG. 7 illustrates an overview of the integrated process performed by the XML encryption client 100 and the service provider 200 remotely through a network 126 such as the internet. Block 300 represents an XML document (X, corresponding to source XML document 2 of FIG. 1) having a structure portion 302 and a content portion 304 (corresponding to portions 6 and 4, respectively). $\epsilon_1(\beta_1)$ denotes an asymmetric encryption process applied to the structural part 302 of the document 300 using public key $\beta_1 \cdot \epsilon_2(\alpha_2)$ denotes a symmetric encryption process applied to textual content 304 using a symmetric private key $\alpha_2 \cdot \epsilon(\beta_1, \alpha_2)$ denotes the combined encryption process over an XML document 300.

The typing properties of the XML document 300 are preserved by $\epsilon(\beta_1, \alpha_2)$ such that standard XML analysis tools may operate on the XML document 300 after encryption. Symmetric encryption E and decryption $\epsilon^{-1}$ have the following properties that capture in an abstract manner the reversibility of the encryption process and the high non-linearity of the exemplary method:

$$\epsilon(\alpha)(x)=y => \epsilon^{-1}(\alpha)(y)=x \tag{1}$$

$$\alpha \neq \alpha' => (\epsilon(\alpha)(x)=y \text{ and } \epsilon^{-1}(\alpha')(y) \neq x) \tag{2}$$

where $\alpha$ is a symmetric private key and x is the data being encrypted, $\epsilon$ is an encryption process (such as the well-known RSA public key encryption algorithm), and $\epsilon^{-1}$ is the decryption process.

Similarly, for asymmetric encryption functions where $\alpha$ is the private key paired with public key $\beta$:

$$\epsilon(\beta)(x)=y => \epsilon^{-1}(\alpha)(Y)=x \tag{3}$$

$$\alpha \neq \alpha' => (\epsilon(\beta)(x)=y \text{ and } \epsilon^{-1}(\alpha')(y) \neq x) \tag{4}$$

The service provider 200 operates on an encrypted XML document (block 306) corresponding to the encrypted XML document 14 of FIG. 3. The encrypted XML document 306 contains a structured portion 308 encrypted with public key β and a content portion 310 encrypted with private key $\alpha_2$. The connections 312, 314 between the XML document 300 at the XML encryption client 100 and the encrypted XML document 306 at the service provider 200 illustrate the relationship between client 100 and service provider 200. Notably, the client 100 encrypts and transmits 312 an encrypted document 306 (corresponding to document 14) to the service provider 200. The service provider 200 performs secure operations on the encrypted document 306 and returns 314 the encrypted document 306 (e.g., as a processed document, corresponding to document 19) to the client 100. The client 100 then decrypts 314 the encrypted XML document 306 to obtain a readable XML document 300. With respect to the encryption and decryption of the XML document 300, only the public encryption key β is provided to the service provider 200. The public encryption key β may be provided to the service provider 200 with each XML document 300, or the key β may be provided once to the service provider 200 and used to encrypt multiple documents. In this manner, the client 100 maintains secure control over the information contained within the XML document 300.

Figure 8:
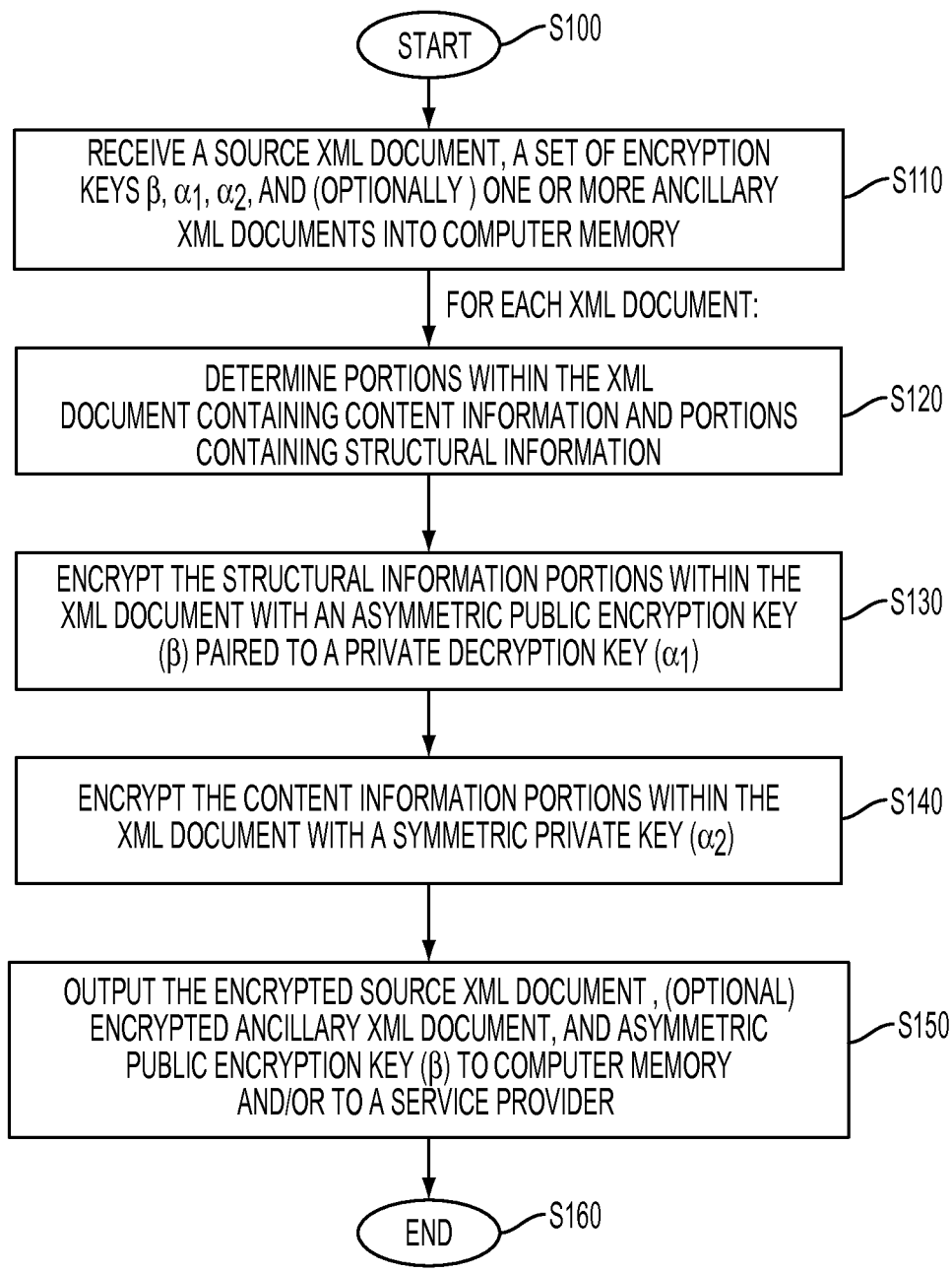
FIG. 8 is a flow chart illustrating an exemplary method for encrypting an XML document for secure processing by a remote XML service provider which may be performed with the exemplary system described with reference to FIG. 5.

FIG. 8 illustrates an exemplary method for encrypting an XML document 2 for secure processing by a remote service provider 200. The method may be performed with the exemplary system 100 described with reference to FIG. 5. The method begins at S100.

At S110, the system 100 receives a source XML document 2, and a set of encryption keys $\beta$, $\alpha_1$, and $\alpha_2$ 12 into computer memory 106, 108. Optionally, an ancillary XML document 10 may be input into computer memory 106, 108 if such a document is used for a desired XML operation and the service provider 200 does not have access to the ancillary XML document 10.

At S120, portions within the source XML document 2 and ancillary XML document 10 containing structural information (FIG. 1, portions 6; FIG. 2, portions 11) and content information (FIG. 1, portions 4) are determined. These operations may be performed, for example, by the structure detection module 112 and content detection module 114, respectively, of the exemplary system 100 described in FIG. 5.

At S130, the determined structural information portions 6, 11 of the source XML document 2 and the ancillary XML document 10 are encrypted with the asymmetric public encryption key $\beta$. Note that general purpose XML attributes such as xmlns, xml:base, xml:space, xml:id may not be encrypted, in order to allow for standard behavior of XML processors. In the exemplary embodiment, the encryption mechanism translates a target string (such as a tag name) into a base 16 encoded sequence of ASCII characters. The algorithm processes and encrypts tags and attributes recursively over the tree structure of the XML document 2. FIG. 3 illustrates the example XML document 2 of FIG. 1 after the structural information portions 6 have been encrypted. FIG. 2 illustrates an example ancillary XML document 10, and FIG. 4 illustrates the same document 10 after encryption, embodied as encrypted ancillary XML document 16. Per the asymmetric encryption, the structural information portions 6, 11 may be decrypted with a private key $\alpha_1$ paired with the public key $\beta$ that is not publicly shared by the system 100. This operation may be performed, for example, by the structure encryption module 116 of the exemplary system 100.

At S140, the determined content information portions 4 of the source XML document 2 are encrypted with a confidential symmetric private key $\alpha_2$. After this encryption is performed, the source XML document 2 has had both the structural information 6 and the content information 4 encrypted and is embodied as an encrypted XML document 14. Per the symmetric encryption process, the content information portions 4 of the encrypted XML document 14 may be decrypted only by the same (or compatibly similar) private key $\alpha_2$. The operations at S140 may be performed, for example, by the content encryption module 118 of the exemplary system 100.

At S150, the encrypted source XML document 14, encrypted ancillary document 16, and public encryption key $\beta$ are output. The outputs 14, 16, $\beta$ may be transmitted to a service provider 200 for processing, or another device such as a client terminal, database system, or the like. Alternatively, outputs 14, 16, $\beta$ may be stored locally in memory 106 or 108.

The method ends at S160.

Figure 9:
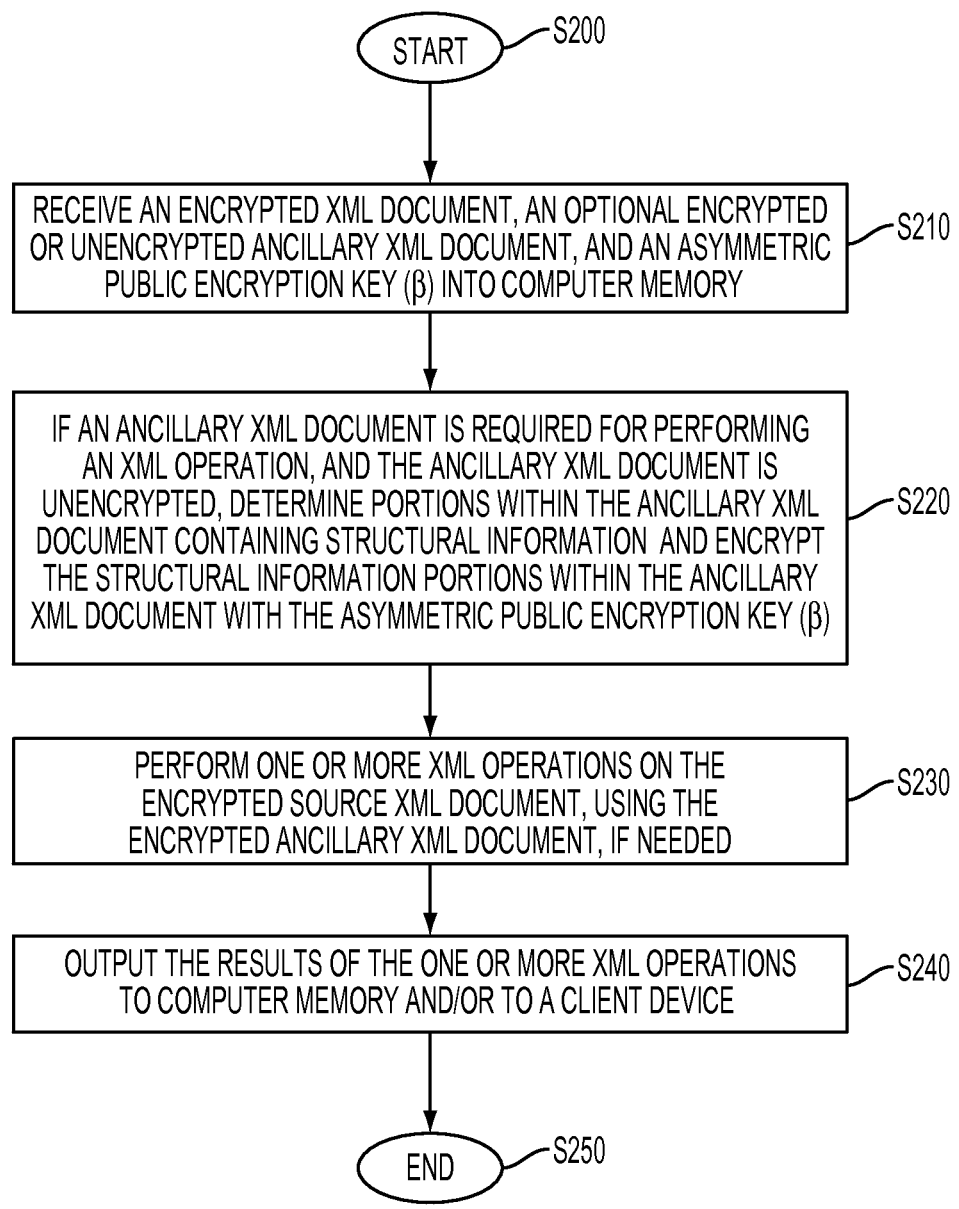
FIG. 9 is a flow chart illustrating an exemplary method for performing secure XML operations on an encrypted XML document generated by the system of FIG. 5 which may be performed with the exemplary service provider system of FIG. 6.

FIG. 9 illustrates an exemplary method for performing secure XML operations on an encrypted XML document 14. The method may be performed with the exemplary service provider system 200 described with reference to FIG. 6. The method begins at S200.

At S210, the service provider 200 receives an encrypted XML document 14, an optional encrypted or unencrypted ancillary XML document 10, 16, and a public encryption key $\beta$ into computer memory 206, 208. In some embodiments, an ancillary XML document 10 is not required in order to perform operations on the encrypted XML document 14. In such embodiments, the method will not perform the actions at S220, and will not receive an ancillary XML document 10 or public encryption key $\beta$ into computer memory 206, 208.

At S220, if an encrypted ancillary XML document 16 (such as an XSL stylesheet) is required to perform an XML operation on the encrypted XML document 14 and the input ancillary XML document 10 is unencrypted, portions (FIG. 2, portions 11) within the ancillary XML document 10 containing structural information are determined. The structural information portions 11 are then encrypted within the ancillary XML document 10 using the public encryption key $\beta$. The process performed at S220 is similar to the process performed at S120 and S130 of FIG. 8 with respect to the ancillary XML document 10. The determination of the structural portions 11 and the encryption of the ancillary XML document 10 may be performed by the structure detection module 212 and structure encryption module 216 of the system 200 shown in FIG. 6.

At S230, one or more XML operations are performed on the encrypted XML document 14, using the encrypted ancillary XML document 16, if needed, to perform the operation. The output resulting from the XML operations is an encrypted XML document 19. Although several operations may be performed on the encrypted XML document 14, four classes of document transformation operators that may be performed on encrypted XML documents 14 are illustrated. Operations other than the example operations described herein are contemplated, and the description of the following operations is not intended to limit the contemplated encryption aware operations that may be performed by the exemplary method. The operations performed at S230 may be performed, for example, by the XML processing module 220 of the system 200 shown in FIG. 4.

Four examples of operations that may be performed on the encrypted XML document 14 by the system 200 are validation, document rewriting and querying, document versioning, and document indexation. However, fewer or other operations are contemplated.

Document Validation

Typically, a tree grammar schema within an XML document may be automatically modified by changing element names in compliance with the public encryption key $\beta$.

For instance, the following grammar:

$$\text{Html} \rightarrow \text{html [Header Body]} \quad (5)$$

$$\text{Header} \rightarrow \text{header [Base? Title? Meta* (Link|Script)*]} \quad (6)$$

$$\text{Body} \rightarrow \text{body [...]} \quad (7)$$

becomes:

$$\text{Html} \rightarrow \epsilon_1(\beta_1) \text{ (html) [Header Body]} \quad (8)$$

$$\text{Header} \rightarrow \epsilon_1(\beta_1)(\text{header}) \text{ [Base? Title? Meta* (Link|Script)*]} \quad (9)$$

$$\text{Body} \rightarrow \epsilon_1(\beta_1)(\text{body}) \text{ [...]} \quad (10)$$

after applying the public encryption key $\beta$ to the structural information portions 6 within the source XML document 2.

If the new labels (8), (9), (10) comply with the inherent lexical constraints of the formalism (e.g. XML), then the corresponding recognition automaton may be derived in the standard way to check the validity of the encrypted document 14. For example, RelaxNG is a validation standard focused on structural validation, although some extensions allow for dealing with attribute or textual content 4. In the latter case, the transcription cannot be achieved stricto sensu (since no access is granted to the encrypted textual content 4 of the encrypted document 14), but it is feasible to derive from such cases a more general schema that only captures the structural information 6, and can even be automated for the general case.

Document Rewriting and Querying

Many transformations within the realm of document rewriting and querying do not require access to textual content 4 within an XML document 2. Examples of such transformations include, but are not limited to, table of contents construction, outline extraction, link extraction, and tag reorganization.

For instance, the following sample rule from an illustrative tree rewriting operation:

$$\text{title } [p[X]p[Y]] \rightarrow \text{title } [p[X\,Y]]$$

may be transformed as:

$$\epsilon_1(\beta_1)(\text{title})[\epsilon_1(\beta_1)(p)[X]\,\epsilon_1(\beta_1)(p)[Y]] \rightarrow \epsilon_1(\beta_1)(\text{title})[\epsilon_1(\beta_1)(p)[X\,Y]]$$

where title and p are structural tags 6 in the source XML document 2, and X and Y are content information 4 within the structural tags 6.

Standard technologies such as XSLT or XQuery use the XPath operation to capture structural information. Thus, structural XPath expressions (such as within an XSL stylesheet 10) may be rewritten to encrypt tag names and attribute names with a public key $\beta$. In these instances, structural XPath expressions do not operate directly on content information 4 such as attribute and textual values. For example, FIG. 4 illustrates an XSLT stylesheet 16 after encrypting the XPath expressions (such as in lines 9 and 11) of the XSLT stylesheet 10 of FIG. 2 with a public encryption key $\beta$. Note that the XPath expressions have been rewritten according to tag name ciphering. FIG. 10 extends this example by applying the encrypted XSLT stylesheet 16 of FIG. 4 to the encrypted XML document 14 of FIG. 3. The resulting XML document 19 has structural information portions encrypted with the public key $\beta$, and content information portions encrypted with the private key $\alpha_2$.

Document Versioning

Document versioning operations are commonly based on tree diff algorithms, and perform structural analysis of tree node hierarchy as well as node comparison. Accordingly, such document versioning operations are compatible with the exemplary method since no direct access to unencrypted content information 4 is required.

Document Indexation

Document indexation operations rely on various techniques employing structural information analysis. An example of such indexation is that used by Apache® Xindices software. Accordingly, document indexation operations may be performed on the encrypted XML document 14 since no direct access to unencrypted content information 4 is required.

At S240, the output 19 generated by the XML operations is output to computer memory 106b, 108b and/or transmitted to a client device such as XML encryption client 100.

The method ends at S250.

Figure 11:
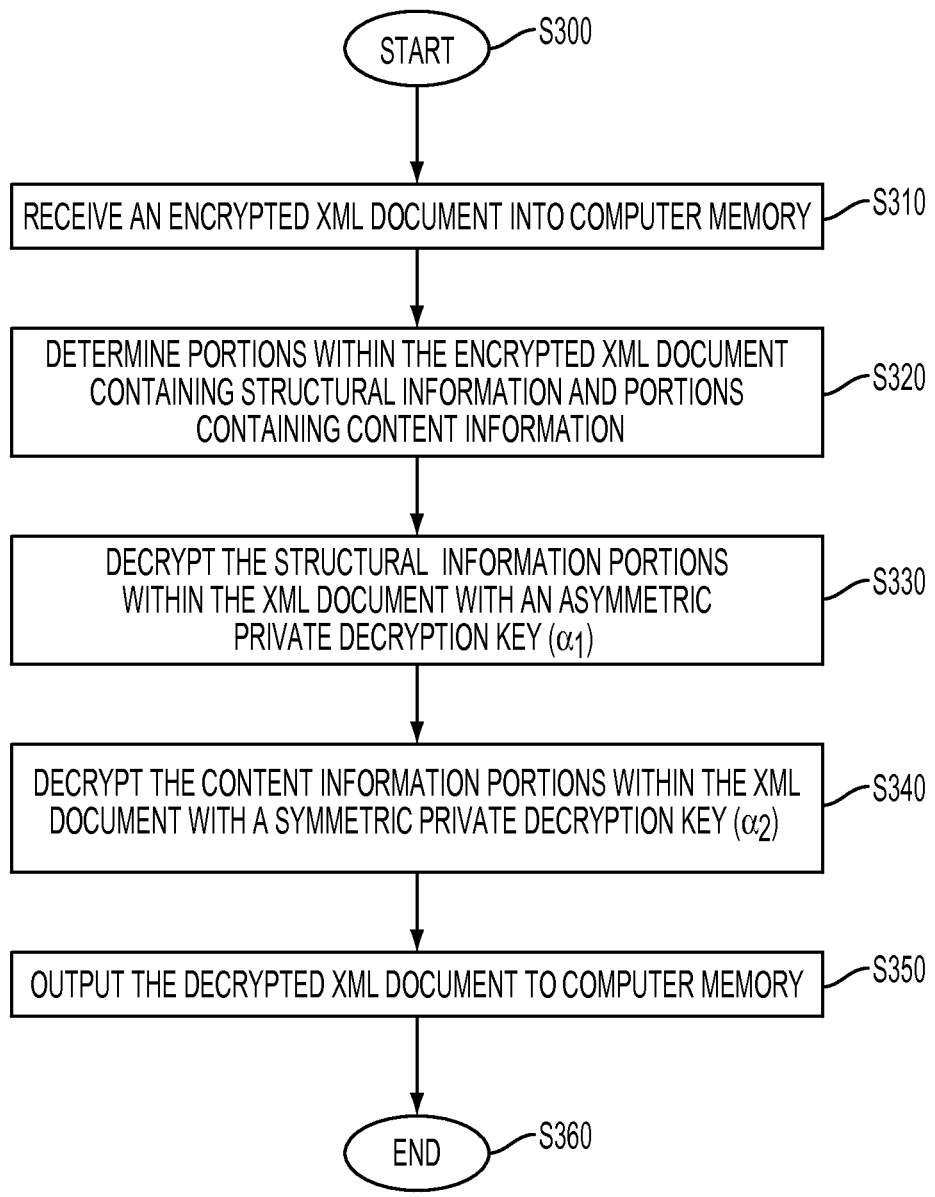
FIG. 11 is a flow chart illustrating an exemplary method for decrypting an XML document encrypted and processed according to the methods of FIGS. 8 and 9.

FIG. 11 illustrates an exemplary method for decrypting an XML document 19 encrypted and processed according to the methods of FIGS. 8 and 9. The method may be performed with the exemplary system 100 described with reference to FIG. 5. As will be appreciated, the device which decrypts the XML document 19 may be the same or a different device from device 100, for example, when the original customer has requested that the service provider sends the results to a different entity. The method begins at S300.

At 310, the system 100 receives an encrypted XML document 19 into computer memory 106, 108. In the exemplary embodiment, the encrypted XML document 19 is generated by a service provider 200 after processing an XML document 14 encrypted by the system 100.

At 320, portions within the encrypted XML document 19 containing structural information (FIG. 1, portions 6) and content information (FIG. 1, portions 4) are determined. These operations may be performed, for example, by the structure detection module 112 and content detection module 114, respectively, of the exemplary system 100 described in FIG. 5.

At 330, the structural information portions 6 within the encrypted XML document 19 are decrypted using asymmetric private key $\alpha_1$. The private key $\alpha_1$ is the key paired with the public encryption key $\beta$. This operation may be performed, for example, by the structure decryption module 116 of system 100 shown in FIG. 5.

At 340, the content information portions 4 within the encrypted XML document 19 are decrypted using symmetric private key $\alpha_2$. The private key $\alpha_2$ is the same key that encrypted the content portions 4 of the source XML document 2. FIG. 12 illustrates unencrypted document 21 after decrypting the encrypted XML document (FIG. 10, document 19) generated by the service provider 200.

At 350, the decrypted XML document 21 is output to computer memory 106, 108 and/or to a client device attached to system 100.

The method ends at S360.

As will be appreciated, the methods shown in FIGS. 8, 9, and 11 can form part of a single method in which the customer generates an encrypted XML document 14, outputs it to the service provider 200, and receives, as input, a processed document 19.

The method illustrated in FIGS. 8, 9, and/or 11 may be implemented in one or more computer program product(s) that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of plementing the flowchart shown in FIGS. 8, 9, and/or 11, can be used to implement the exemplary method(s).

Extension

As a practical matter, encrypting tag names may raise a security issue due to the low entropy level of common XML vocabulary, especially when the target namespace is known or guessed by an attacker. For instance, if a code breaker intercepts encrypted XML document 14 and knows that the document is using the HTML namespace, he could try breaking the encryption using "html" as the plaintext input of the encrypted top level tag. Thus, one optional solution is to use optimal asymmetric encryption padding to make hacking the encryption mechanism more difficult. Asymmetric encryption padding is a known technique used to transform a string (such as a tag name) by adding characters before applying encryption. For example, the tag name "html" may be padded with random characters "ar33" to produce "htmlar33." When encryption is applied to the document containing the tag name, the string "htmlar33" is encrypted rather than "html." This makes the encryption mechanism more robust. Some embodiments employ multiple ancillary secure hash functions (such as SHA and MD5) and a random pattern in order to increase the entropy (resistance to unauthorized decryption) of the input message.

In order to provide yet another layer of security, during the exchange of documents between the client 100 and the service provider 200, a supplemental global encryption layer using a symmetric scheme with a private key may be employed. In such an embodiment, the private key is exchanged between the client 100 and service provider 200. However, even if this private key is intercepted or divulged (assuming that it is not the same private key $\alpha_1$, $\alpha_2$ used to encrypt the XML document 2), the underlying encryption of the XML document 14 remains as a strong layer of security.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for encrypting a document, comprising:
    encrypting a portion of an XML source document comprising structural information with an asymmetric public key;
    encrypting a portion of the XML source document comprising content information with a symmetric private key;
    determining portions within an ancillary XML document containing information relevant to the structural information of the source XML document;
    encrypting the determined portions within the ancillary XML document with an asymmetric public key; and
    outputting the encrypted source document to computer memory.

2. The method of claim 1, wherein the encryption is performed using a computer processor.

3. The method of claim 1, wherein the document is a logical tree based structure capturing syntax and semantic properties of the document.

4. The method of claim 3, wherein the document is a source XML document.

5. The method of claim 4, wherein structural information comprises information derived from XML document markup tags, and content information is information within the document that is not structural information.

6. The method of claim 1, wherein the ancillary XML document is used when performing an XML operation on the XML source document.

7. The method of claim 1, wherein the ancillary XML document is an XML stylesheet.

8. The method of claim 1, further comprising:
    determining portions within the document containing structural information; and
    determining portions within the document containing content information.

9. The method of claim 1, further comprising:
    performing asymmetric encryption padding on at least a portion of the structural information or content information.

10. The method of claim 1, further comprising:
    transmitting the asymmetric public key and encrypted document to a remote service provider and retaining the symmetric private key.

11. A computer program product comprising a non-transitory storage medium encoding instructions, which when executed by a computer, performs the method of claim 1.

12. A system comprising memory which stores instructions for performing the method of claim 1 and a processor for performing the instructions.

13. A method for processing a document comprising:
    with a processor, encrypting a document comprising:
        encrypting a portion of a document comprising structural information with an asymmetric public key, and
        encrypting a portion of the document comprising content information with a symmetric private key;
    outputting the encrypted document to a service provider, the service provider being able to decrypt portions within the encrypted document containing structural information with an asymmetric private key but is not able to decrypt portions within the encrypted document containing content information without access to the symmetric private key; and
    optionally, receiving as input a document processed by the service provider which is derived from the encrypted document.

14. A method for decrypting an encrypted document, comprising:
    receiving an encrypted document which includes structural information and content information, the structural information comprising metadata used to capture and transmit information related to the logical organization of the content information within the encrypted XML document;
    with a processor, decrypting portions within the encrypted document which contain the structural information with an asymmetric private key;
    decrypting other portions within the encrypted document which contain the content information with a symmetric private key; and
    outputting the decrypted document.

15. The method of claim 14, wherein the encrypted document is an encrypted XML document.

16. The method of claim 15, wherein the structural information comprises information derived from document markup positioned between consecutive brackets.

17. The method of claim 14, further comprising:
    determining portions within the encrypted document containing structural information; and determining portions within the encrypted document containing content information.

18. A computer program product comprising a non-transitory storage medium encoding instructions, which when executed by a computer, performs the method of claim 14.

19. A method for performing XML operations on an encrypted XML document, comprising:
receiving an encrypted XML input document from a remote client system via a network, the encrypted XML input document including structural information encrypted with a first encryption method for which an encryption key is provided and content information encrypted with a second encryption method for which an encryption key is not provided, whereby portions within the encrypted document containing content information are not able to be decrypted, the structural information comprising metadata used to capture and transmit information related to the logical organization of the content information within the encrypted XML document;
with a processor, decrypting the encrypted structural information and generating an encrypted XML output document by performing an XML operation on the encrypted XML input document based on the decrypted encrypted structural information of the encrypted XML input document; and
outputting the encrypted XML output document to a client system via the network.

20. The method of claim 19, further comprising:
receiving an ancillary XML document and an asymmetric public key into computer memory;
determining portions within the ancillary XML document containing information relevant to the structural information of the encrypted XML input document; and
generating an encrypted ancillary XML document by encrypting the determined portions within the ancillary XML document with the asymmetric public key.

21. The method of claim 20, wherein the ancillary XML document is an XML stylesheet; and
wherein one or more XML operations are performed on the encrypted input XML document using the encrypted ancillary XML document.

22. The method of claim 19, wherein the XML operation comprises at least one of the group consisting of:
document validation,
document rewriting and querying,
document versioning, and
document indexation.

23. A system for performing at least one of encrypting a source document and decrypting an encrypted document, comprising:
memory which stores:
a structure detection module adapted to determine portions within the source document or encrypted document containing structural information, the structural information comprising metadata used to capture and transmit information related to the logical organization of the content information within the encrypted XML document;
a content detection module adapted to determine portions within the source document or encrypted document containing the content information;
a structure encryption and decryption module adapted to perform at least one of the following:
encrypt the determined structural information portions within the source document with an asymmetric public key, and
decrypt the determined structural information portions within the encrypted document with an asymmetric private key;
a content encryption and decryption module adapted to perform at least one of the following:
encrypt the determined content information portions within the source document with a symmetric private key, and
decrypt the determined content information portions within the encrypted document with the symmetric private key; and
a processor which implements the modules.

24. The system of claim 23:
wherein the system is adapted to transmit the following to an XML processing system:
an encrypted XML document encrypted by the structure encryption and decryption module and the content encryption and decryption module, and
the asymmetric public key used to encrypt the structural information portions within the encrypted XML document; and
wherein the XML processing system comprises:
a structure detection module adapted to determine portions within an ancillary XML document containing information relevant to the structural information of the encrypted XML document,
a structure encryption module adapted to generate an encrypted ancillary XML document by encrypting the determined portions within the ancillary XML document with the asymmetric public key, and
an XML processing module adapted to:
generate an encrypted XML output document by performing one or more XML operations based on the encrypted structural information within the encrypted XML document, and
employ the encrypted ancillary XML document when performing the XML operations.

25. The system of claim 24, wherein the ancillary XML document comprises an XML stylesheet.

26. A computer program product comprising a non-transitory storage medium encoding instructions, which when executed by a computer, performs the method of claim 14.

* * * * *